United States Patent [19]
Danisch et al.

[11] Patent Number: 5,791,107
[45] Date of Patent: Aug. 11, 1998

[54] BUILDING WITH A SEALING ELEMENT

[75] Inventors: Rüdiger Danisch, Erlangen; Manfred Hümmer, Höchstadt, both of Germany

[73] Assignee: Siemens Aktiengesellschaft, Munich, Germany

[21] Appl. No.: 442,804

[22] Filed: May 17, 1995

Related U.S. Application Data

[63] Continuation-in-part of Ser. No. 36,920, Mar. 25, 1993, abandoned.

[30] Foreign Application Priority Data

Apr. 3, 1992 [DE] Germany .............. 42 11 293.1

[51] Int. Cl.$^6$ .............. F04B 1/74; G21C 13/02
[52] U.S. Cl. .............. 52/249; 52/245; 52/405.3; 52/408; 52/169.11; 376/294
[58] Field of Search .............. 52/64, 271, 249, 52/247, 245, 268, 309.8, 396.01, 404.1, 405.2, 405.3, 408, 169.11, 405.4; 376/293, 294, 295, 296

[56] References Cited

U.S. PATENT DOCUMENTS

| 134,911 | 1/1873 | Mattfeld | 52/268 X |
|---|---|---|---|
| 681,242 | 8/1901 | Morgeneier | 52/249 X |
| 795,984 | 8/1905 | Julian | 52/249 X |
| 2,542,951 | 2/1951 | Werner | 52/249 X |
| 2,743,602 | 5/1956 | Dunn | 52/293.3 X |
| 3,059,734 | 10/1962 | Tripp | 52/245 X |
| 3,308,589 | 3/1967 | Yoshioka et al. | 52/249 |
| 3,322,141 | 5/1967 | Gans, Jr. et al. | 52/249 X |
| 4,183,221 | 1/1980 | Yamamoto | 52/249 X |
| 4,344,264 | 8/1982 | Smith | 52/247 |
| 4,701,299 | 10/1987 | Alibran et al. | 376/302 |
| 4,939,878 | 7/1990 | Schuhbauer | 52/169.14 |
| 5,092,092 | 3/1992 | Kiekens et al. | 52/407 X |

FOREIGN PATENT DOCUMENTS

| 312753 | 1/1974 | Austria . |
|---|---|---|
| 0103097 | 7/1987 | European Pat. Off. . |
| 526167 | 5/1931 | Germany . |
| 1059123 | 12/1959 | Germany . |
| 1801433 | 8/1970 | Germany . |
| 2326071 | 12/1974 | Germany . |
| 2554576 | 6/1977 | Germany . |
| 2843356 | 8/1986 | Germany . |
| 3230311 | 1/1988 | Germany . |
| 257658 | 6/1988 | Germany . |
| 3802086 | 8/1989 | Germany . |
| 3904594 | 8/1990 | Germany . |
| 59-118966 | 7/1984 | Japan . |
| 61-119891 | 6/1986 | Japan . |

OTHER PUBLICATIONS

Transplantation der Dampferzeger bei einem Kernkraftwerk VGB Kraftwerkstechnik 71 (1991, No. 8);.

*Primary Examiner*—Carl D. Friedman
*Assistant Examiner*—Winnie S. Yip
*Attorney, Agent, or Firm*—Herbert L. Lerner; Laurence A. Greenberg

[57] ABSTRACT

The invention pertains to a building, particularly in the context of a nuclear installation. The building is formed with an outer shell and an inner shell which form an intermediate space therebetween. A sealing element is disposed in the intermediate space. The sealing element is gas tight, it envelopes the inner shell, and it is largely freely movable perpendicularly to the surfaces of the shells defining the intermediate space. Pressure fluctuations, particularly pressure waves, originating on the inside of the building are received and equalized by the sealing element, while the gas-tightness of the sealing element is largely assured.

17 Claims, 5 Drawing Sheets

BUILDING WITH A SEALING ELEMENT

CROSS-REFERENCE TO RELATED APPLICATION

This application is a continuation-in-part of application Ser. No. 08/036,920, filed Mar. 25, 1993.

BACKGROUND OF THE INVENTION

1. Field of the Invention

The invention relates to a building, in particular a containment for a nuclear facility, having an outer and an inner shell that are spaced apart from one another, and a sealing element located between the two shells.

2. Description of the Related Art

A building of the type to which the invention pertains is described in German published, non-prosecuted application DE 25 54 576 A1. In it, an interstice between an outer and an inner wall of a building is filled with a plasticizable material that has sealing properties. That material is firmly joined to the two walls.

The prior art building is intended to offer protection against external mechanical influences. It is not constructed to protect against mechanical influences from the interior. An exertion of force upon the inner wall can destroy it, which could also directly cause damage to the sealing element.

U.S. Pat. No. 3,322,141 to D. Gans, Jr., et al. describes a containment vessel of a nuclear power plant whose primary task is the enclosure for safety of a reactor pressure vessel and the control of leaks. Another task of the containment is to restrain liquid, gas or steam at high temperatures or pressures in the event of a malfunction, so that no leakage in the direction of the external environment will occur. For that purpose, this containment has an outer shell and a closed liner extending within the outer shell. The liner is made up of welded-together steel plates, so that it has a high degree of gas tightness. Its function is thus to close off the interior of the containment in gas-tight fashion. An intermediate space remains between the liner and the outer shell in which a bent metal plate, for instance a ribbed 15 metal plate, is disposed.

The deformed plate is connected to the outer wall and the liner at a number of points. This plate is made up such that with the liner, it defines an annular space. This space can be evacuated by suitable means so that if a liner leak 20 occurs, gas can be removed by suction. In the containment described in U.S. Pat. No. 3,322,141, the element that effects the gas-tight enclosure, the liner, is not protected against factors acting on it from inside.

SUMMARY OF THE INVENTION

It is accordingly an object of the invention to provide a building, which overcomes the hereinafore-mentioned disadvantages of the heretofore-known devices of this general type and which remains gas-tight even after mechanical influences from the building interior are exerted upon the building structure. It is a further object to provide a building structure which can be constructed with simple means and in an economical manner.

With the foregoing and other objects in view there is provided, in accordance with the invention, a building, for instance in a nuclear installation, and particularly for a nuclear power plant containment. The building, comprises:

an outer shell having an inner wall surface, and an inner shell disposed inside the outer shell and having an outer wall surface, the outer and inner shells being spaced apart from one another and forming an intermediate space defined between the inner and outer wall surfaces; and a gas-tight sealing element disposed in the intermediate space and enveloping the inner shell, the sealing element being largely freely movable between the inner and outer wall surfaces in a direction oriented substantially perpendicularly to the inner and outer wall surfaces.

In accordance with an added feature of the invention, the inner shell is dome-shaped and defines a geodetically highest point. The sealing element rests on the geodetically highest point and/or it is secured thereto.

Alternatively, or additionally, the sealing element may also be secured to a geodetically highest point of the outer shell.

In accordance with additional feature of the invention, the shells have mutually spaced-apart vertically extending portions, and the sealing element extends between the vertically extending portions without contacting either of the vertically extending portions.

In accordance with another feature of the invention, the inner shell is formed of concrete. The sealing element may be in the form of a sheet metal liner or a plastic liner.

In accordance with a further feature of the invention, the sealing element includes at least one deformation compensating member. Such a deformation compensating member is a vertically acting deformation compensating member and/or a horizontally acting deformation compensating member.

In accordance with yet another feature of the invention, the deformation compensating member is a segment formed in the sealing element and it is bent multiple times in accordion fashion, i.e. in Z-layers.

In accordance with yet an added feature of the invention, the inner shell has openings which allow pressure equalization from inside towards the sealing element.

In accordance with yet a further feature of the invention, the inner shell is formed of a plurality of component members and there are gaps defined between respective ones of the plurality of component members for pressure equalization.

In accordance with a concomitant feature of the invention, the inner shell has a bottom and the outer shell has a bottom, and the sealing element is disposed between the bottom of the inner shell and the bottom of the outer shell.

In other words, the object of the invention is attained by a building for a nuclear plant, having an outer shell and an inner shell, which are spaced apart from one another and thus form an intermediate space, and a sealing element disposed in the intermediate space, in that the sealing element is gas-impermeable, envelopes the inner shell, and between the surface of the inner shell toward the intermediate space and the surface of the outer shell toward the intermediate space is largely freely movable in the direction at right angles to the surfaces. To that end, the sealing element preferably has a thickness that is markedly less than the distance between the inner shell and the outer shell. In the event of increased pressure loads in the building, which are transmitted by the inner shell to the sealing element, the sealing element can move largely freely toward the outer shell and thus contribute to reducing the pressure. The tightness of the sealing element is preserved in this case especially also because the motion of the sealing element is limited by the outer shell, because the sealing element, given a suitable pressure, rests flush against the outer shell. If there is a negative-pressure load, conversely, the sealing element moves in the direction of the surface of the inner shell, and the motion is limited by contact with the inner shell. The sealing element is thus suitable both for a gas-tight envelopment of the inner shell under normal pressure conditions in the interior of the building, and upon overpressure or negative-pressure loads in the interior of the building. This is especially advantageous in a building that forms the containment of a nuclear plant, with the reactor core located in the containment. In the event of disruptions in operation in the nuclear plant that involve increased pressure values or a transitory negative pressure, the integrity of the containment is preserved, including in particular its gas-tightness. Because of the mobility of the sealing element, it can deflect both inward and outward when acted upon by a force, in particular a pressure, and since it is not rigidly disposed it can absorb the incident forces without becoming gas-permeable. Thus the building remains gas-tight even in the presence of mechanical or hydrodynamic factors from the interior.

The sealing element is preferably located at the geodetically highest point of the inner shell; in a spherical shell, this point is unequivocally defined, while in a shell that is flattened or level in the region of the geodetically highest point, the term "geodetically highest point" should be considered to mean a corresponding surface or a line. The sealing element rests loosely by gravity against the inner shell and thus has a particularly large amount of play for reacting to incident forces. In particular, the sealing element can be displaced and expanded in various directions, without damage from incident forces occurring.

The sealing element can also be secured at the geodetically highest point of the inner shell, without substantially restricting its free mobility and thus impairing the ability to absorb incident forces without damage.

The highest point of the inner shell is suitable for fastening, especially because this provides mobility of the sealing element over the entire height of the inner shell.

It is likewise possible for the sealing element to be secured to the geodetically highest point of the outer shell. This again is intended to assure an unintentional displacement of the sealing element. This avoids an unnecessary load on the sealing element from a displacement during normal operation of the building. If the outer shell is dome-shaped, then the geodetically highest point is unequivocally defined; in a flattened shell, the term "geodetically highest point" should correspondingly be understood to mean a line or a surface to which the sealing element can be secured.

In shells that each have adjacent vertically extending parts, the sealing element is preferably disposed such that it extends between the two shells without contact with the surfaces of the shells. This provides free mobility both in the direction of the outer shell, for instance to absorb pressure waves, and mobility in the direction of the inner shell, for instance in response to a transitory negative pressure. It is favorable for that purpose to join the sealing element to one or both shells at the respective geodetically highest point, as a result of which it is suspended freely hanging down as far as the bottom of the shells, and is freely movable in the entire region between the geodetically highest point of the vertically extending parts and the bottom. By its suspension from the geodetically highest point of the vertical parts, stabilization of the position of the sealing element between the shells is obtained in addition. The sealing element then hangs in a manner comparable to a curtain in the intermediate space between the two shells. Incident forces can displace the sealing element out of its position, and if the incident forces disappear the sealing element can swing back into its original position. Damage to the sealing element from incident forces is thus reliably averted. In contrast to a rigid fastening, the danger that the sealing element will rip away from corresponding rigid mounts is averted.

The inner shell is preferably made of concrete, and regardless of the material from which it is made, it brings about protection of the sealing element from effects exerted from the interior of the building. Such effects include radial and temperature, for instance, as well as mechanical strains.

The sealing element is preferably a lining, in particular a so-called liner of the kind used in a containment for a nuclear plant.

Such a liner may be put together from metal plate or plastic in gas-tight fashion.

To compensate for and absorb thermal expansions, the sealing element preferably has at least one deformation compensating piece. By means of this deformation compensating piece, extensive dimensional stability of the sealing element is attained even in the presence of major temperature changes. In particular, lengthwise expansions of the sealing element can be compensated for thereby.

To that end, at least one vertically and/or one horizontally acting deformation compensating piece are for instance provided. This assures compensation for thermal expansions of the sealing element. The deformation compensating piece may be embodied as a segment bent multiple times in a Z. This segment may be either compressed or stretched out in the manner of an accordion.

The inner shell of the building preferably has openings that in particular serve to provide pressure equalization. A pressure wave from the interior of the building is then compensated for by the fact that this pressure wave passes through the openings through the inner shell, and in the intermediate space strikes the extensively freely movable sealing element. As a result, damage to the inner shell from the pressure wave is prevented, and the largely freely movable sealing element intercepts this pressure wave by means of a motion in the directional of the outer shell. The sealing element likewise remains undamaged, or in other words remains gas-tight in particular, since even if it is fastened at isolated points it is still so mobile and capable of expansions that its being ripped away from the fastenings is averted. Fastenings that may be present are for that purpose located correspondingly far away from the openings. The effect is thus that even pressures waves from the interior of the building are controlled. The inner shell therefore need not itself be designed so as to withstand any pressure load. Instead, the inner shell is designed such that impact factors to be expected, as well as the effects of temperature and radiation, are controlled. Compared with a solid shell designed to withstand pressure waves, the shell used here can be made with a markedly reduced thickness.

The inner shell is preferably made up of a plurality of pieces. These pieces can be prefabricated, so that fast erection of the inner shell is accomplished. Thus an inner shell can also be made in simple fashion even in the course of retrofitting an existing building.

Joints are provided between pieces, through which a pressure wave can reach the sealing element. If the joints remain largely open between the pieces, then no special openings in the inner shell are needed in order to equalize the pressure between the interior of the building and the intermediate space. The inner shell, the sealing element and the outer shell preferably together form the containment of a nuclear power plant, thereby providing effective protection of the containment against mechanical impacts (from inside through the inner shell, from outside through the outer shell) and against the effects of temperature and radiation. In particular, the non-gas-permeable sealing element affords effective protection against pressure waves from the interior of the containment. Even a possible negative pressure in the interior of the containment impairs neither the stability nor the impermeability to gas of the sealing element. In that case, it is merely moved far enough inward that it rests against the inner shell. Damage to the sealing element inside the inner shell and ripping out of the sealing element from possibly existing mounts are thus averted. This is true above all whenever the sealing element is freely suspended in the intermediate space and is merely secured to the geodetically highest point of the vertically extending parts of the shells.

To produce a complete envelopment, on an inner shell resting on a bottom plate, the sealing element extends between the bottom plate of the inner shell and the bottom plate of the outer shell that surrounds the inner shell. For this purpose, it can extend without fastenings between the two bottom plates. This portion of the sealing element extending between the bottom plates is preferably joined in gas-tight fashion, directly in the region of the vertically extending parts of the inner and outer shells at which these parts end at the respective bottom plate, to the sealing element disposed in the intermediate space.

Other features which are considered as characteristic for the invention are set forth in the appended claims.

Although the invention is illustrated and described herein as embodied in a building with a sealing element, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
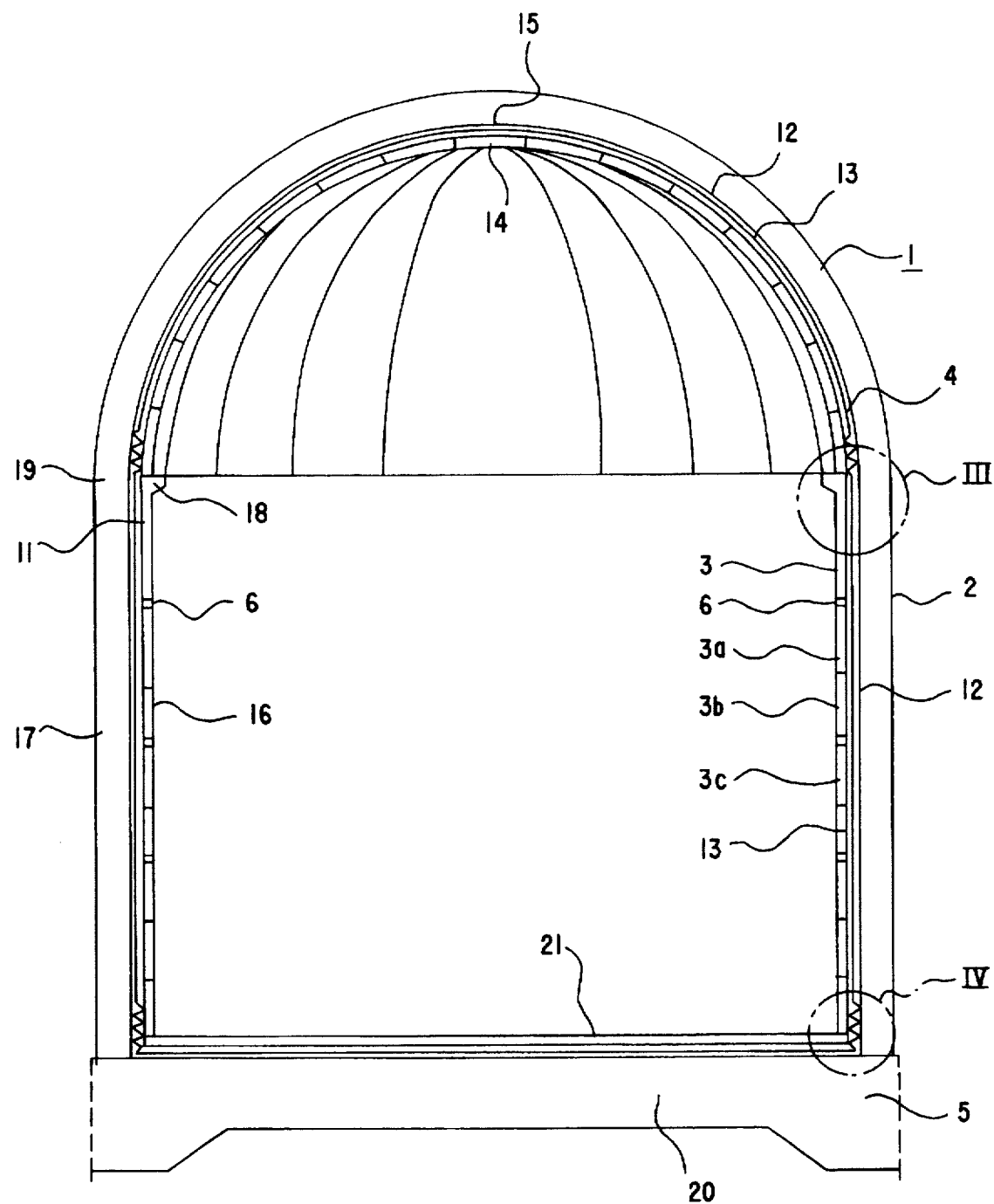
FIG. 1 is a diagrammatic, vertical-sectional view of a building with an outer and an inner shell and with a sealing element.
Figure 2:
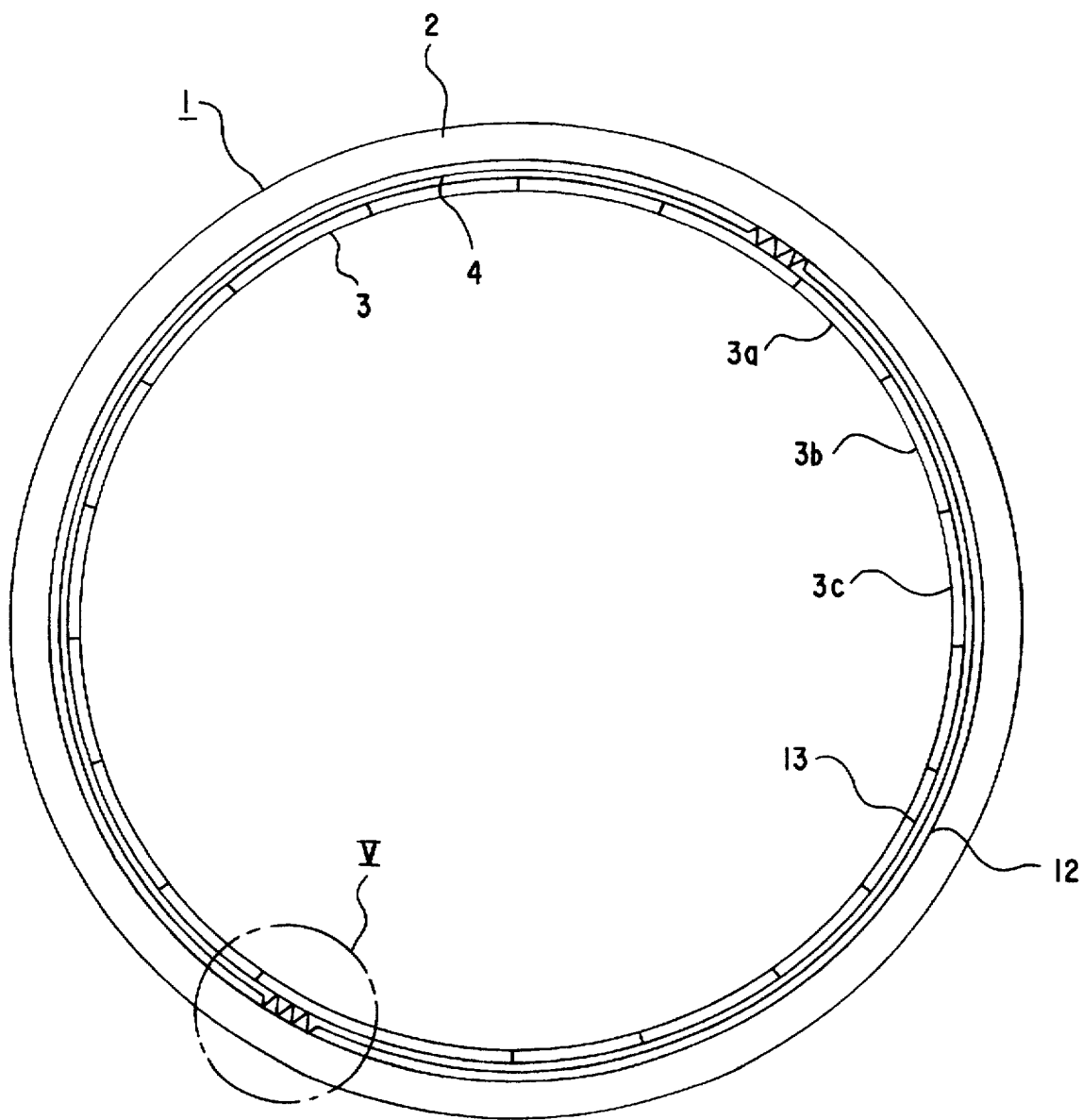
FIG. 2 is a horizontal-sectional view of the building of FIG. 1.

Referring now to the figures of the drawing in detail and first, particularly, to FIGS. 1 and 2 thereof, there is seen a building with wall formed of an outer shell 2 and an inner shell 3. Each shell 3 and 2 has a respective vertically extending cylindrical portion 16, 17, and above this cylindrical portion 16, 17 runs together in domed fashion, each to a respective geodetically highest point 14, 15. The outer dome-shaped shell 2 thus encloses the inner, likewise dome-shaped shell 3. The two shells 2, 3 are spaced apart from one another so that an intermediate space 11 remains between an inner wall surface of the outer shell 2 and an outer wall surface of the inner shell 3. Located in this intermediate space 11 is a gas-tight sealing element 4, which is suspended freely, like a curtain, at least in the vertical portion of the intermediate space 11 formed by the vertically extending portions 16, 17 of the shells 2, 3. In this vertically extending portion, the sealing element 4 is spaced apart both from the surface 12 of the outer shells 2 and the surface 13 of the inner shell 3. The sealing element 4 contacts the geodetically highest point 14 of the inner shell 3. The outer shell 2, which is of concrete, is seated on a bottom member or base 20, which is a part of the foundation plate 5 of the building 1. The bottom 20 and the outer shell 2 entirely enclose the inner shell 3, which is likewise seated on a corresponding bottom 21. The sealing element 4 is disposed, extending horizontally, between the bottom 21 and the bottom 20. In the region where the vertically extending portions 16, 17 are connected to the associated bottoms 20, 21, it is joined to the likewise vertically extending portion of the sealing element 4 (see FIG. 4). The vertically extending sealing element, as shown in FIG. 3, is suspended in the region of the geodetically highest point 18, 19 of the vertically extending portions 16, 17 of the inner shell 3 and outer shell 2, respectively.

The inner shell 3 has openings 6, through which a pressure wave from the interior of the building 1 reaches the intermediate space 11. When pressure waves arise, this reduces the load on the inner shell 3, so that the inner shell is likewise made of concrete, with a lesser wall thickness than the outer shell 2. A pressure wave passes through the openings 6 in the vertical portion 16 of the inner shell 3 to strike the sealing element 4. Since the sealing element is freely movable in the direction of the outer shell 2, and in particular is not fixedly mounted, it deflects outwardly. This deflection motions ends with contact against the outer shell 2, and the sealing element 4 after that, while pressure still prevails, contacts the outer shell 2, so that in the sealing element 4, only slight expansion can occur, and it therefore remains unharmed and in particular gas-tight. Because of its capability of swinging freely in both directions, the sealing element 4 can react to pressure fluctuations and withstand them unharmed. Even major pressure impositions cannot impair the stability of the sealing element 4, since the outward deflection path in both directions is limited by the two shells 2, 3 of the building 1. The sealing element 4 is protected by the inner shell 3 against not only temperature and radiation factors but also mechanical impacts arising from the interior of the building 1.

The sealing element 4 is a liner of sheet metal or plastic. The inner shell 3 is made up of individual portions 3i a, 3b, 3c (or component members 3a, 3b, 3c), and as a result is especially simple to manufacture, especially in the course of retrofitting.

Figure 3:
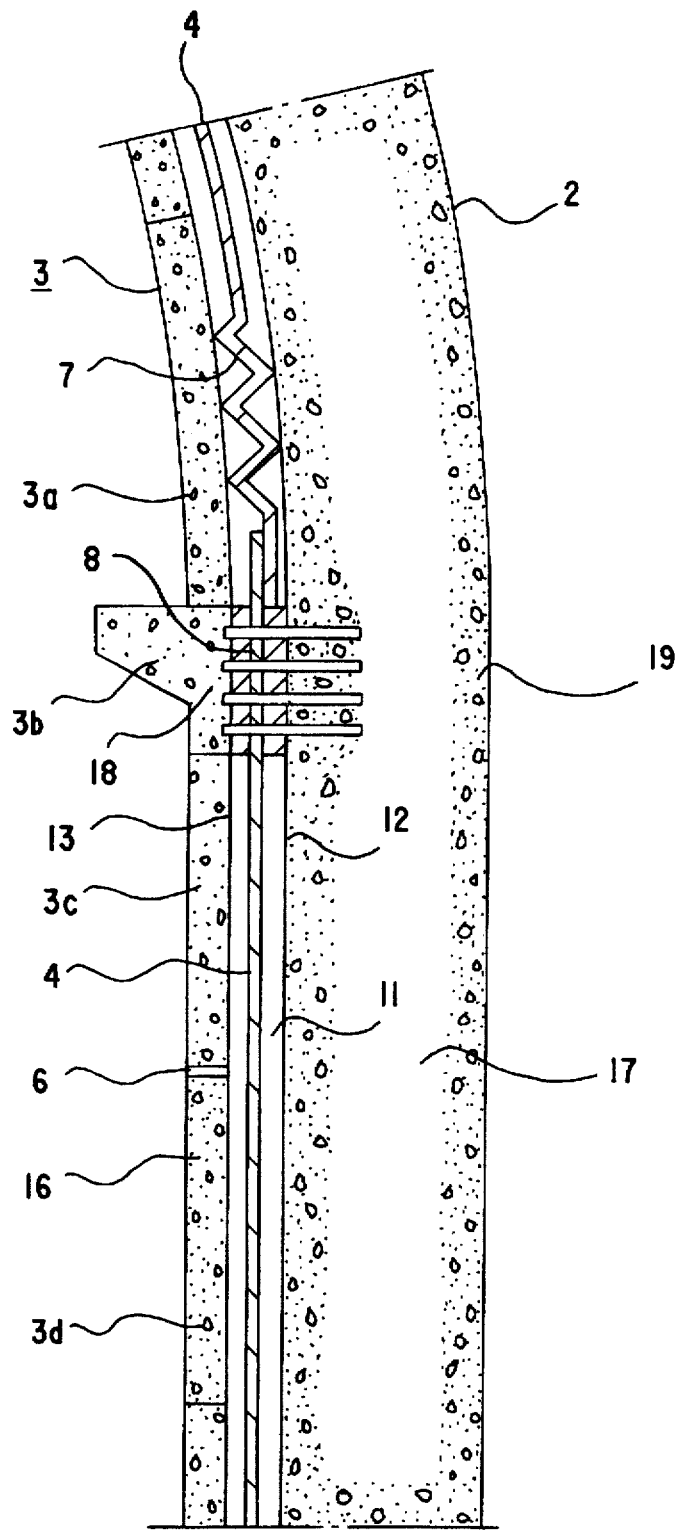
FIG. 3 is an enlarged view of a portion of FIG. 1, showing a vertical section of a building wall with an inner shell made of prefabricated parts and with a deformation equalization piece.

FIG. 3 shows a detail of a vertical section through the building 1 in the region of the geodetically highest points 18, 19 of the vertically extending portions 16, 17 of the inner shell 3 and outer shell 2, respectively. The reference numerals match those of FIG. 1 and indicate the same building parts. A holder 8 is disposed between the geodetically highest point 18 of the inner shell 3 and the geodetically highest point 19 of the outer shell 2, in each case of the corresponding vertically extending portion 16, 17, in the intermediate space 11, and the holder is firmly joined to both the inner shell 3 and the outer shell 2. The sealing element 4 is retained with the holder 8, so that geodetically it hangs freely like a curtain below the holder 8 between the surface 13 of the inner shell 3 and the surface 12 of the outer shell 2. Geodetically above the holder 8, the sealing element 4 has a deformation compensating member 7 (or deformation equalizing member 7), which is embodied in a multiple Z shape (i.e. accordion pleated, zig-zag). Geodetically below the holder 8, an opening 6 is provided in the inner shell 3. In the region of the holder 8, the inner shell 3 is reinforced by a suitable piece 3b. By disposing the deformation compensating piece 7 above the holder 8, temperature expansions of the sealing element 4 extending within the domes region of the shells 2, 3 are compensated for, so that damage to the holder 8 and thus to the sealing element 4 from thermal strains is averted. Geodetically below the holder 8, the sealing element can move largely freely between the surfaces 12, 13 of the inner shell 3 and outer shell 2, respectively. The opening 6 in the inner shell 3 is disposed far enough away from the holder 8 that even deflection of the sealing element 4 as far as the surface 12 of the outer shell 2 or the surface 13 of the inner shell 3, the thermomechanical strains on the sealing element 4 at the holder 8 will in no case exceed the allowable values. The gas tightness of the sealing element thus remains assured. The outer shell 2 is made markedly thicker than the inner shell.

Figure 4:
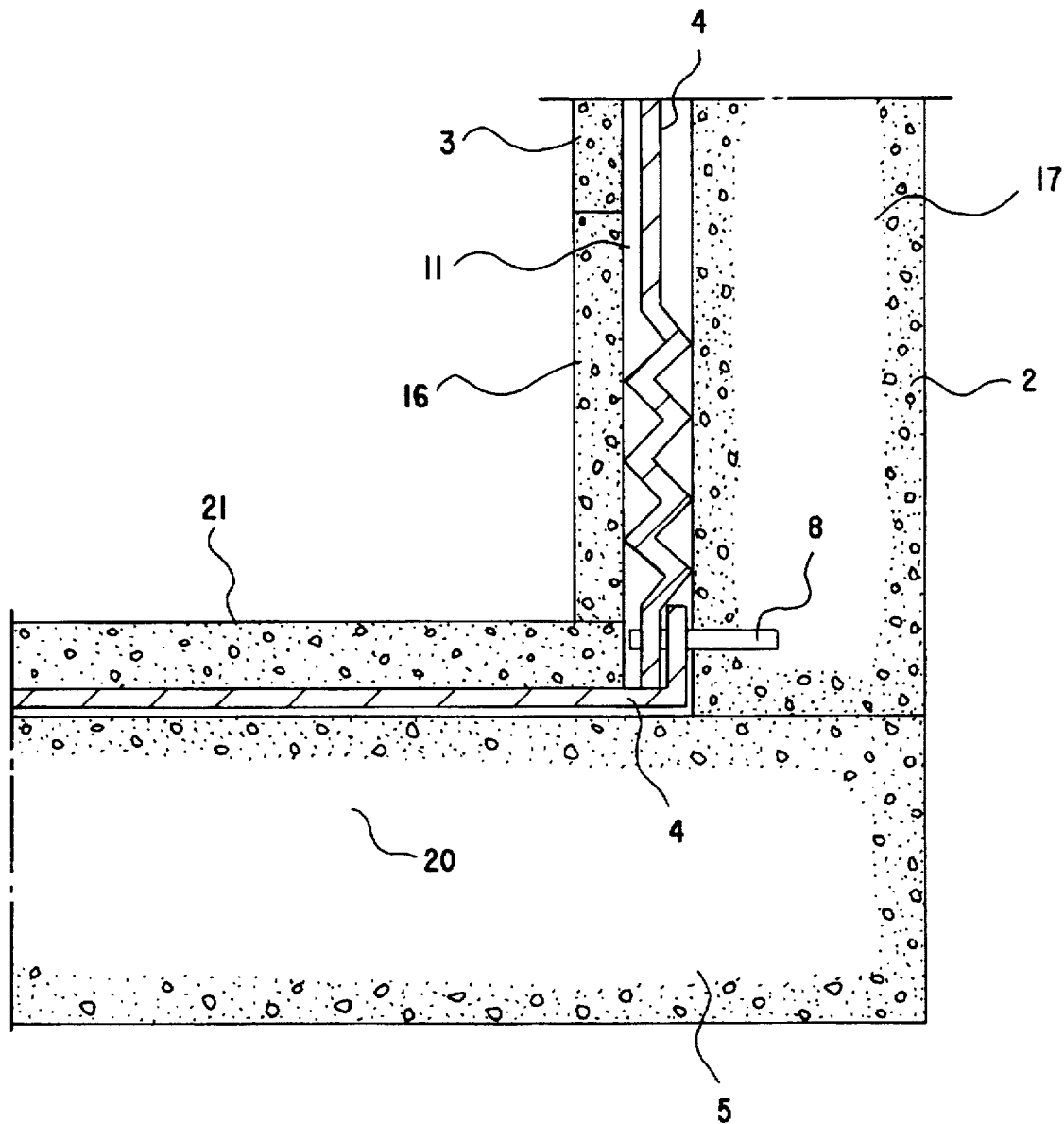
FIG. 4 is an enlarged view of a portion of FIG. 1, in a region where a foundation plate and the shells are connected.

FIG. 4, on a larger scale, shows a section through the building 1 in the transitional region between the vertically extending portions 16, 17 and the respective associated extending portion, has a deformation compensating piece 7. Between the bottoms 20, 21, the sealing element 4 is clamped in place, extending horizontally, and curved into the intermediate space 11. There, it is joined in gas-tight fashion to the deformation compensating piece 7 and, via a holder 8, to the outer shell 2. With the deformation compensating piece 7 as well, thermal expansions of the vertically extending sealing element 4 hanging like a curtain are compensated for.

Figure 5:
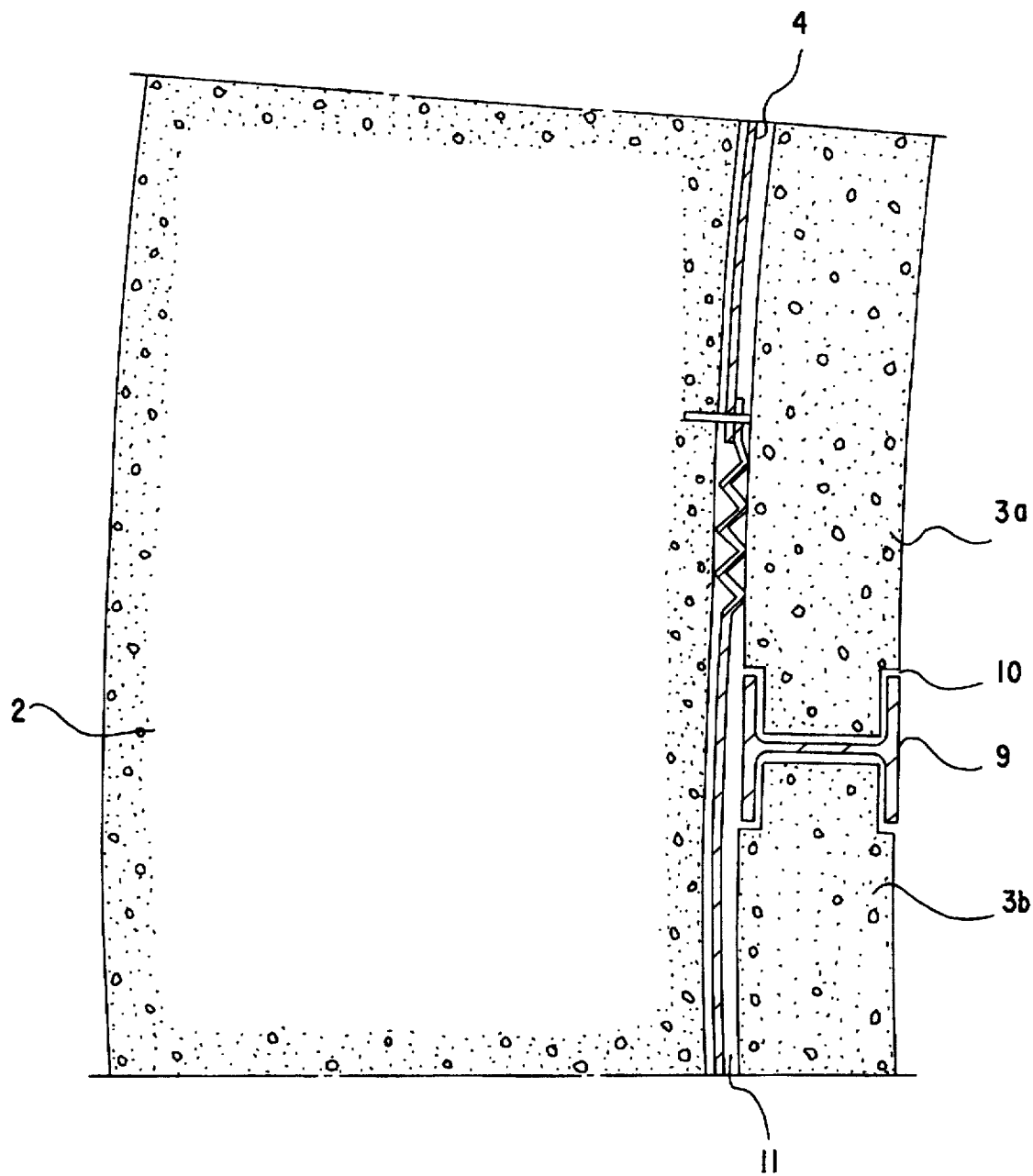
FIG. 5 is an enlarged view of a portion of FIG. 2, with a deformation equalization member and with an inner shell made of prefabricated parts.

FIG. 5 shows a detail of the building 1 in a horizontal section. Pieces 3a and 3b of the inner shell 3 are joined together by a profiled body 9, in the form of a double-T beam. Between the pieces 3a, 3b and the profiled body 9, open gaps 10 remain which serve to equalize the pressure in the interior of the building 1 and the intermediate space 11. The sealing element is located in the intermediate space 11 and at individual points, for the sake of compensation for expansion, it has a deformation compensating piece 7 bent multiple times in Z-like fashion. At these individual points, the sealing element 4 can be secured to the outer shell 2, without impairing an especially free displacement of the sealing element 4 toward either the outer shell 2 or the inner shell 3.

The invention is distinguished by the fact that a building, in particular a containment of a nuclear power plant, has an outer shell that encompasses an inner shell and is spaced apart from it such that an intermediate space remains. In the intermediate space, a gas-tight sealing element is provided, enveloping the inner shell. The sealing element has a thickness that is less than the thickness of the intermediate space. In the intermediate space, it is largely freely movable toward the surfaces of both the inner shell and the outer shell. To that end, the sealing element is joined to one of the two shells preferably at only a few isolated points. The inner shell protects the deformation compensating piece from the effects of radiation and from mechanical factors. By means of openings in the inner shell, pressure waves are transmitted to the sealing element without notable strain on the inner shell. These pressure waves or pressure surges cause a displacement of the sealing element, which because of its largely free mobility and the limitation of its motion by the surface of the inner shell and outer shell is strained below the allowable load limits. As a result, the building is embodied as gas-tight even with respect to strains from its interior.

We claim:

1. A building, comprising:

an outer shell having an inner wall surface, and an inner shell disposed inside said outer shell and having an outer wall surface, said outer and inner shells being spaced apart from one another and forming an intermediate space defined between said inner and outer wall surfaces;

said shells having mutually spaced-apart vertically extending portions; and a gas-tight sealing element disposed in said intermediate space and enveloping said inner shell, said sealing element being freely movable between said mutually spaced-apart vertically extending portions of said inner and outer shells in a direction oriented substantially perpendicularly to said inner and outer wall surfaces.

2. The building according to claim 1, wherein said inner shell has an upper dome-shaped part with a geodetically highest point, and said sealing element contacting said geodetically highest point.

3. The building according to claim 2, wherein said sealing element is secured to said geodetically highest point.

4. The building according to claim 1, wherein said outer shell has an upper dome-shaped part with a geodetically highest point, said sealing element being secured to said geodetically highest point.

5. The building according to claim 1, said sealing element extends between said vertically extending portions without contacting either of said vertically extending portions.

6. The building according to claim 1, wherein said vertically extending portions have an upper end, and said sealing element is joined to at least one of said inner and outer shells at said upper end.

7. The building according to claim 1, wherein said inner shell is formed of concrete.

8. The building according to claim 1, wherein said sealing element is a liner.

9. The building according to claim 8, wherein said liner is formed of one of sheet metal and plastic.

10. The building according to claim 1, wherein said sealing element includes at least one deformation compensating member.

11. The building according to claim 10, wherein said at least one deformation compensating member is at least one vertically acting deformation compensating member and at least one horizontally acting deformation compensating member.

12. The building according to claim 10, wherein said deformation compensating member is a segment formed in said sealing element and being bent multiple times in accordion fashion.

13. The building according to claim 1, wherein said inner shell has openings formed therein for pressure equalization.

14. The building according to claim 1, wherein said inner shell is formed of a plurality of component members.

15. The building according to claim 14, wherein said inner shell has open gaps formed between respective ones of said plurality of component members for pressure equalization.

16. The building according to claim 1, wherein inner shell and the outer shell form a containment of a nuclear power plant.

17. The building according to claim 16, wherein said inner shell has a bottom and said outer shell has a bottom, said sealing element being disposed between said bottom of said inner shell and said bottom of said outer shell.

* * * * *